(12) United States Patent
Flynn et al.

(10) Patent No.: US 9,878,801 B2
(45) Date of Patent: Jan. 30, 2018

(54) CONSOLE ASSEMBLY INCLUDING STOWABLE SUPPORT SURFACE

(71) Applicant: Gulfstream Aerospace Corporation, Savannah, GA (US)

(72) Inventors: Tristan Flynn, Savannah, GA (US); Todd Loar, Savannah, GA (US); Eric Long, Huntington Beach, CA (US); Conrad Strelzyk, Montreal (CA); Bryan Clarke, Montreal (CA)

(73) Assignees: C&D AEROSPACE CANADA CO., Kirkland (CA); GULFSTREAM AEROSPACE CORPORATION, Savannah, GA (US)

( * ) Notice: Subject to any disclaimer, the term of this patent is extended or adjusted under 35 U.S.C. 154(b) by 0 days.

(21) Appl. No.: 14/866,164

(22) Filed: Sep. 25, 2015

(65) Prior Publication Data

US 2016/0101865 A1    Apr. 14, 2016

Related U.S. Application Data

(60) Provisional application No. 62/063,391, filed on Oct. 13, 2014.

(51) Int. Cl.
*A47K 1/08* (2006.01)
*B64D 43/00* (2006.01)

(52) U.S. Cl.
CPC .................................... *B64D 43/00* (2013.01)

(58) Field of Classification Search
CPC ............ B60N 3/002; B60N 2/102; A47C 7/70
See application file for complete search history.

(56) References Cited

U.S. PATENT DOCUMENTS

| | | | | |
|---|---|---|---|---|
| 3,606,112 A | * | 9/1971 | Cheshier | B60N 3/08 108/143 |
| 4,417,764 A | * | 11/1983 | Marcus | B60N 3/102 108/44 |
| 7,311,354 B2 | * | 12/2007 | Giasson | B64D 11/06 297/145 |
| 8,646,393 B2 | * | 2/2014 | Souillac | B60R 11/00 108/45 |
| 2017/0015251 A1 | * | 1/2017 | Arendsen | B60R 7/04 |

\* cited by examiner

*Primary Examiner* — Amy Sterling
(74) *Attorney, Agent, or Firm* — Jeffer Mangels; Butler & Mitchell LLP; Brennan C. Swain, Esq.

(57) ABSTRACT

A console assembly for use on a flight deck of an aircraft includes, but is not limited to, a console having a recess. The recess has an opening. The console assembly further includes a mounting assembly mounted within the recess. The console assembly further includes a support surface mounted to the mounting assembly. The console assembly further includes a closeout panel that is mounted to the support surface. The support surface fits within the recess. The mounting assembly facilitates movement of the support surface between a retracted and a deployed position. The support surface is disposed within the recess while in the retracted position and outside of the recess while in the deployed position. The closeout panel is disposed at a location on the support surface that causes the closeout panel to close the opening of the recess when the support surface is in the retracted position.

17 Claims, 4 Drawing Sheets

CONSOLE ASSEMBLY INCLUDING STOWABLE SUPPORT SURFACE

CROSS-REFERENCE TO RELATED APPLICATIONS

This application claims the benefit of U.S. Provisional Patent Application 62/063,391, filed on 13 Oct. 2014 and entitled "Cockpit Tray," which is hereby incorporated herein by reference in its entirety.

TECHNICAL FIELD

The present invention generally relates to aircraft and more particularly relates to a console assembly for use on an aircraft, the console assembly including a stowable support surface.

BACKGROUND

Modern flight decks utilize side stick controllers instead of conventional yokes. Conventional yokes are located just aft of the forward instrument panel and resides between the legs of an aircrew member. Side stick controllers, on the other hand, are mounted to a console that is located on either the port side or the starboard side (or both) of the flight deck and are positioned to the side of an aircrew member. By placing the controller to the side of the aircrew member, the space directly in front of the aircrew member becomes available for other purposes.

Throughout a flight, a seated aircrew member may use the space directly in front of him or her for various purposes. For example, the aircrew member may use a tablet computer device to engage with the aircraft and therefore needs a place to rest the tablet computer device. The aircrew member may have paperwork to complete during the flight and needs a surface to support that paperwork while writing. The aircrew member may eat one or more meals during a flight and needs a surface to support his or her meal.

A countervailing consideration is the need to have free space in front of the pilot to permit the pilot to freely move about or reach towards any part of the instrument panel during flight without obstruction. The presence of a surface in front of the aircrew member may limit the aircrew member's ability to access all areas of the instrument panel and may therefore be undesirable.

Another consideration is aesthetics. Modern aircraft, and especially modern business jets, place a premium on the appearance of their interiors. This applies to the flight deck as well as to the passenger cabin. It would not be sufficient to merely provide a utilitarian solution to the above described situation. Rather, what is needed is a solution that is functional without sacrificing form.

Accordingly it is desirable to provide console assembly that provides the aircrew members with a surface that does not impede the aircrew member's ability to access or view the instrument panel and that does not detract from an otherwise pleasing visual appearance. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of a console assembly for use on a flight deck of an aircraft are disclosed herein.

In a first non-limiting embodiment, the console assembly includes, but is not limited to, a console that is configured to be mounted in the flight deck of the aircraft. The console has a recess. The recess has an opening. The opening faces towards the flight deck when the console is mounted in the flight deck. The console assembly further includes, but is not limited to a mounting assembly mounted within the recess. The console assembly further includes, but is not limited to a support surface that is mounted to the mounting assembly. The console assembly still further includes, but is not limited to a closeout panel that is mounted to the support surface. The support surface is configured to fit within the recess. The mounting assembly is configured to facilitate movement of the support surface between a retracted position and a deployed position. The support surface is disposed within the recess when the support surface is in the retracted position. The support surface is disposed outside of the recess when the support surface is in the deployed position. The closeout panel is disposed at a location on the support surface that causes the closeout panel to close the opening of the recess when the support surface is in the retracted position.

In another non-limiting embodiment, the console assembly includes, but is not limited to a console that is configured to be mounted in the flight deck of the aircraft. The console has a recess. The recess has an opening. The opening faces towards the flight deck when the console is mounted in the flight deck. The console assembly further includes, but is not limited to, a mounting assembly that is mounted within the recess. The console assembly further includes, but is not limited to, a support surface that is mounted to the mounting assembly. The console assembly further includes, but is not limited to, an engagement surface that is mounted to the support surface. The engagement surface protrudes above an upper surface of the support surface. The console assembly further includes, but is not limited to, a latch that is associated with the console. The console assembly still further includes, but is not limited to, a closeout panel mounted to the support surface. The support surface is configured to fit within the recess. The mounting assembly is configured to facilitate movement of the support surface between a retracted position and a deployed position. The support surface is disposed within the recess when the support surface is in the retracted position. The support surface is disposed outside of the recess when the support surface is in the deployed position. The support surface is retained in the retracted position by the latch when the latch is latched. The support surface is free to move to the deployed position when the latch is unlatched. The closeout panel is disposed at a location on the support surface that causes the closeout panel to close the opening of the recess when the support surface is in the retracted position. The engagement surface has a higher coefficient of static friction than the upper surface of the support surface.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved console assembly is disclosed herein. In a non-limiting embodiment, the console assembly includes a console that is configured to be mounted in the flight deck of an aircraft. In some examples, the console may be an instrument panel or any other suitable console configured for mounting in a flight deck. The console includes a recess. Mounted within the recess is a mounting assembly. The mounting assembly is configured to extend and retract within the recess.

Mounted to the mounting assembly is a support surface that can be extended or retracted together with the mounting assembly. The support surface may be any suitable surface having any suitable shape and configuration. In some examples, the support surface may include, but not be limited to, a tray, a shelf, a table, a desk, and the like. When extended, the support surface is disposed outside of the recess and generally positioned in front of the aircrew member. In this position, the support surface can support paperwork, tablet computers, meal trays, and the like. When retracted, both the support surface and the mounting assembly are stowed completely within the recess.

Attached to the support surface is a closeout panel. When the support surface and the mounting assembly are retracted within the recess, the closeout panel covers the opening to the recess and conceals the mechanical/structural components of the support surface and the mounting assembly. In some embodiments, an outwardly facing surface of the closeout panel may be adorned with a decorative pattern that is similar in appearance to other patterns on the console. When so adorned, a consistent, uninterrupted appearance is presented across the face of the console that maintains an aesthetically pleasing appearance.

A greater understanding of the flight deck arrangement described above may be obtained through a review of the illustrations accompanying this application together with a review of the detailed description that follows.

Figure 1:
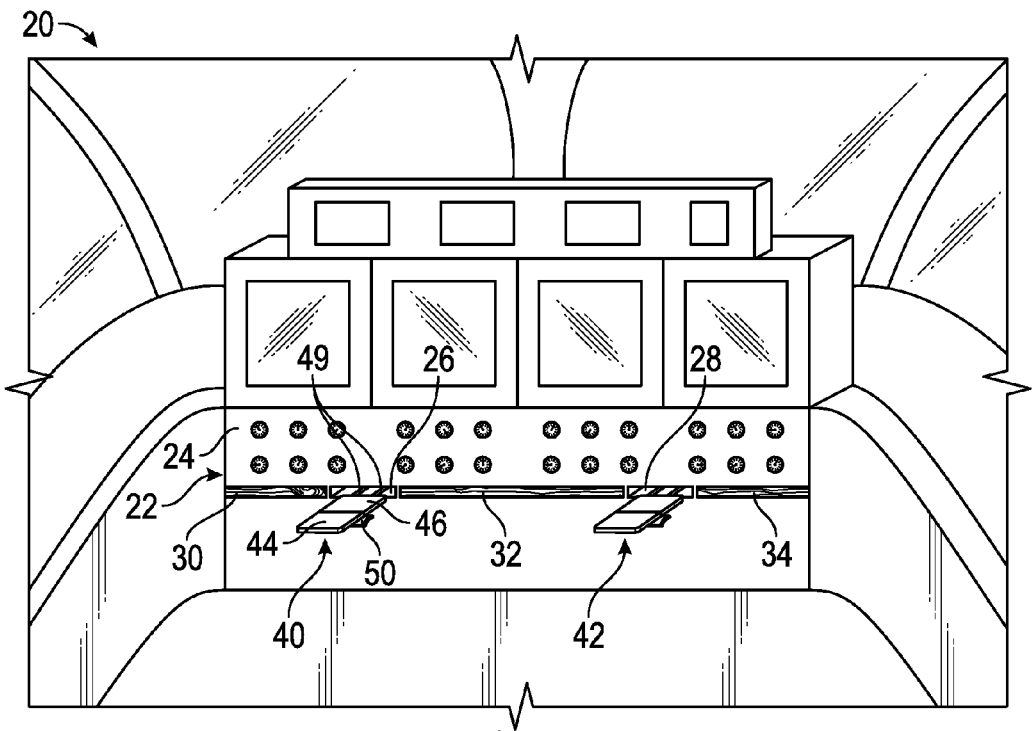
FIG. 1 is a perspective view illustrating a flight deck of an aircraft equipped with a non-limiting embodiment of a console assembly of the present disclosure, the console assembly arranged to provide a support surface to aircrew members.

FIG. 1 is a perspective view of a flight deck 20 equipped with a console assembly 22 that is made in accordance with the teachings of the present disclosure. Console assembly 22 includes a console 24. In the illustrated embodiment, console 24 is an instrument panel that houses the display screens, gauges, and readouts utilized by aircrew members to operate the aircraft. In other embodiments, console 24 need not be the instrument panel, but rather may be any other console mounted in the flight deck of an aircraft.

Console 24 includes a recess 26 and a recess 28. Recesses 26 and 28 extend forward into console 24. Console 24 includes decorative panels 30, 32, and 34 positioned on either side of recesses 26 and 28. Decorative panels 30, 32, and 34 present an aesthetically pleasing appearance to occupants of flight deck 20.

Console assembly 22 further includes a support surface 40 and a support surface 42. In FIG. 1, support surfaces 40 and 42 are in their deployed positions and extend outside of recesses 26 and 28, respectively. Support surface 40 and support surface 42 are substantially identical and, for the sake of brevity, only support surface 42 will be discussed in detail. Nevertheless, it should be understood that the discussion herein of support surface 40 applies with equal force to support surface 42.

In the illustrated embodiment, support surface 40 includes a half surface 44 and a half surface 46. In the illustrated embodiment, half surface 44 and half surface 46 are joined together by a hinge 48 (see FIGS. 4-8) and are configured to pivot with respect to one another. In the illustrated embodiment, half surface 44 can be folded over and on top of half surface 46. In FIG. 1, half surface 44 is illustrated in an unfolded state. In the illustrated embodiment, half surface 44 must be folded over and on top of half surface 46 in order to stow support surface 40 in recess 26. In other embodiments, support surface 40 may comprise a single body. In still other embodiments, half surface 44 and half surface 46 may be joined via a living hinge, via a multi-bar linkage, or via any other suitable coupling mechanism that permits half surface 44 and half surface 46 to expand and contract. This will provide the aircrew member with a larger surface area when deployed and a compact package when retracting/stowing.

Support surface 40 further includes a pair of mounting arms 49. Pair of mounting arms 49 are configured to engage with a mounting assembly 60 (See FIG. 4). Pair of mounting arms 49 are further configured to support the support surface 40 on mounting assembly 60 when support surface 40 is disposed the deployed position, in the retracted position, and as support surface 40 is moved between the deployed position and the retracted positions.

Console assembly 22 further includes a close out panel 50. Closeout panel 50 is attached to support surface 40. When support surface 40 is in the deployed position, as illustrated in FIG. 1, closeout panel 50 is disposed below support surface 40. As will be discussed below, when support surface 40 is retracted into recess 26, closeout panel 50 will be positioned to cover the opening to recess 26.

Figure 2:
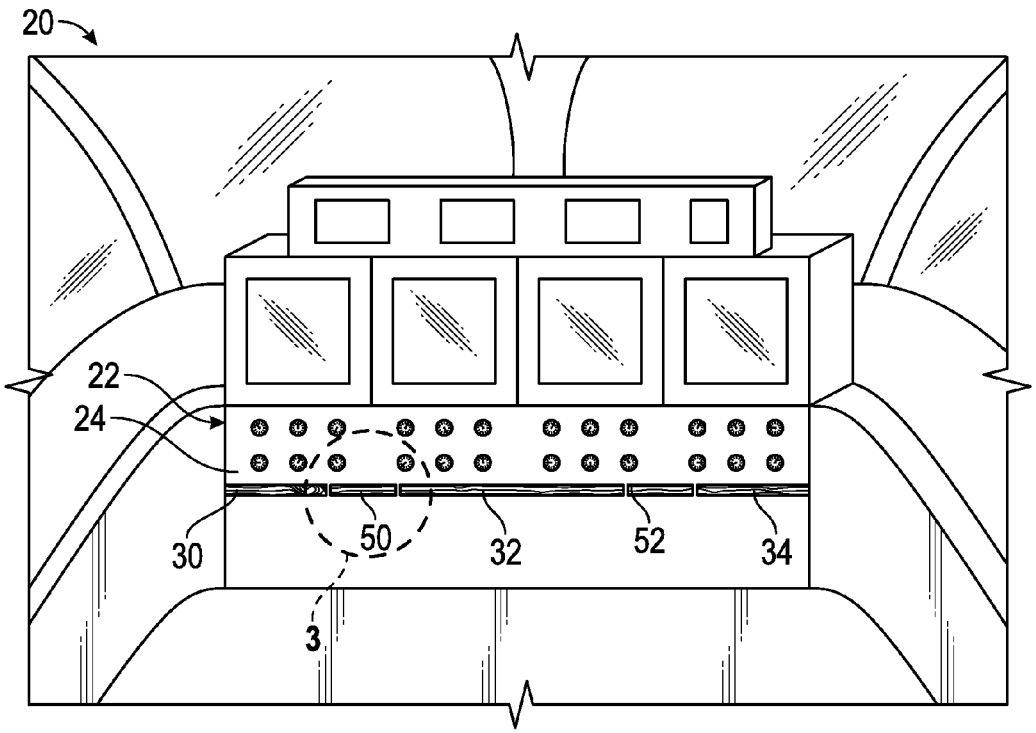
FIG. 2 is a perspective view illustrating the flight deck of FIG. 1 with the console assembly arranged to stow the support surfaces.

With continuing reference to FIG. 1, FIG. 2 again illustrates flight deck 20 and console assembly 22. In FIG. 2, however, support surface 40 and support surface 42 have been stowed in their retracted positions within recess 26 and recess 28, respectively. Closeout panel 50 is positioned over the opening to recess 26 and a close out panel 52 associated with support surface 42 is positioned over the opening to recess 28. Closeout panels 50 and 52 are aligned with decorative panels 30, 32, and 34 such that together, these five panels present the appearance of a continuous, substantially unbroken trim accent piece for console 24.

Figure 3:
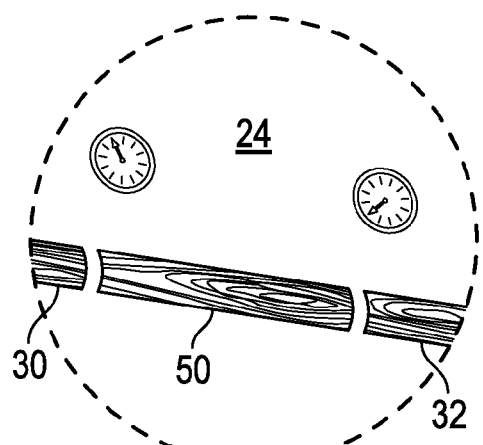
FIG. 3 is an expanded perspective view illustrating the portion of the console assembly circled in FIG. 2.

FIG. 3 is a perspective view presenting an expanded view of the portion circled by phantom line 3 in FIG. 2. In the illustrated embodiment, decorative panel 30 and decorative panel 32 have a wood grain appearance. As illustrated, closeout panel 50 is adorned with the same wood grain appearance. In other embodiments, any other suitable or desirable pattern and/or appearance may be employed without departing from the teachings of the present disclosure. For example, these panels may have a simple painted finish of any suitable or desirable color (e.g., black). Both the alignment and close proximity of these three panels creates the appearance of a continuous, uninterrupted trim component which contributes to the creation of an aesthetically pleasing appearance.

Figure 4:
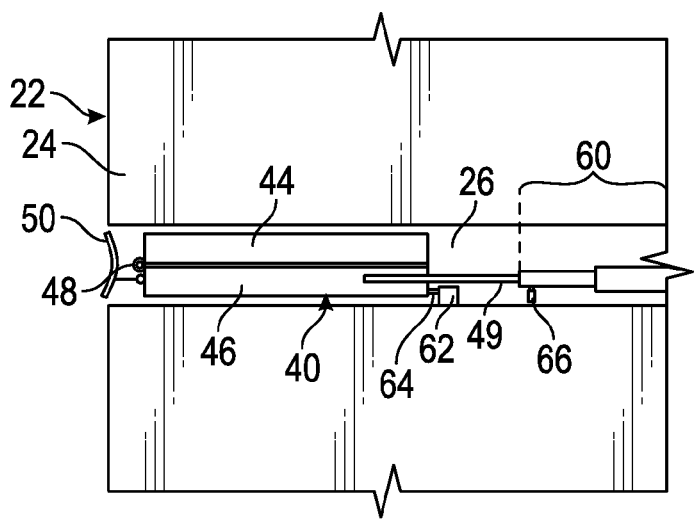
FIG. 4 is a schematic side view illustrating the support surface in a retracted position within the console assembly.
Figure 5:
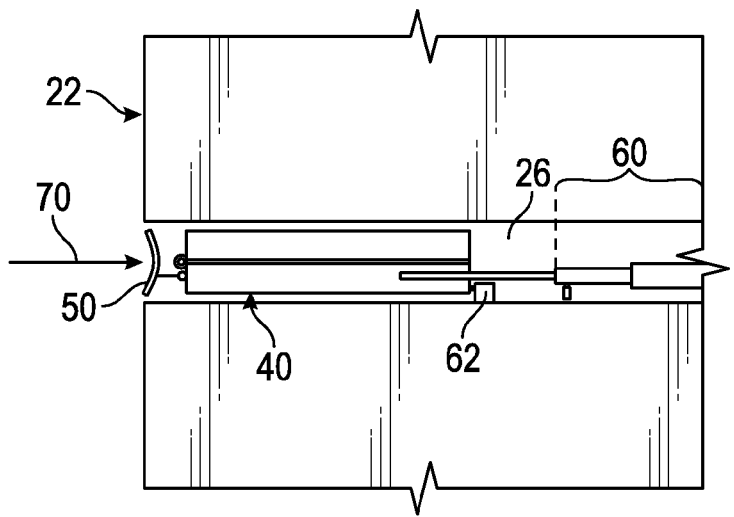
FIG. 5 is a schematic side view illustrating an initial stage of the support surface's transition from the retracted position to a deployed position.

FIG. 4 is a schematic side view illustrating console assembly 22. As illustrated, recess 26 is defined in console 24. Support surface 40 and mounting assembly 60 are disposed in their retracted position within recess 26. Half surface 44 is folded over on top of half surface 46 to give support surface 40 a more compact profile that is compatible with the dimensions of recess 26. Hinge 48, which pivotally mounts half surface 44 to half surface 46, is visible in this view. Multiple hinges such as hinge 48 may be required to join half surface 44 to half surface 46. Mounting assembly 60 is illustrated in its compressed or retracted state. One mounting arm of pair of mounting arms 49 can be seen joining support surface 40 to mounting assembly 60.

A push-push latch 62 is mounted to a surface of recess 26 and is configured to alternately latch and unlatch support surface 40. A latch engaging rod 64 is attached to an end of half surface 46 and is configured to engage push-push latch 62. Push-push latches are known in the art and, generally, are configured to alternately unlatch and latch via a push; if first push unlatches the push-push latch, then a second push will latch the push-push latch. Accordingly, a first push by an aircrew member on closeout panel 50 will unlatch push-push latch 62 causing it to disengage from latch engaging rod 64 and unlock support surface 40 and mounting assembly 60 from their retracted positions and enable an aircrew member to move support surface 40 and mounting assembly 60 to their extended positions. This process will be described in greater detail below. Once support surface 40 and mounting assembly 60 are returned to their retracted positions, a second push by the aircrew member on closeout panel 50 will cause push-push latch 62 to engage with and latch the latch engaging rod 64, thereby locking support surface 40 and mounting assembly 60 in their retracted positions.

A quick release actuator 66 is attached to mounting assembly 60 and is configured such that, when actuated, pair of mounting arms 49 may be quickly removed from mounting assembly 60. Quick release mechanisms are known in the art and any suitable mechanism may be employed to facilitate release of pair of mounting arms 49 without departing from the teachings of the present disclosure.

With continuing reference to FIGS. 1-4, FIG. 5 is a schematic side view of console assembly 22 as an aircrew member pushes on closeout panel 50 in the direction indicated by arrow 70. By pushing in an inward direction on closeout panel 50, push-push latch 62 is unlatched and releases latch engaging rod 64. Support surface 40 and mounting assembly 60 are now free to begin moving towards their extended positions.

Figure 6:
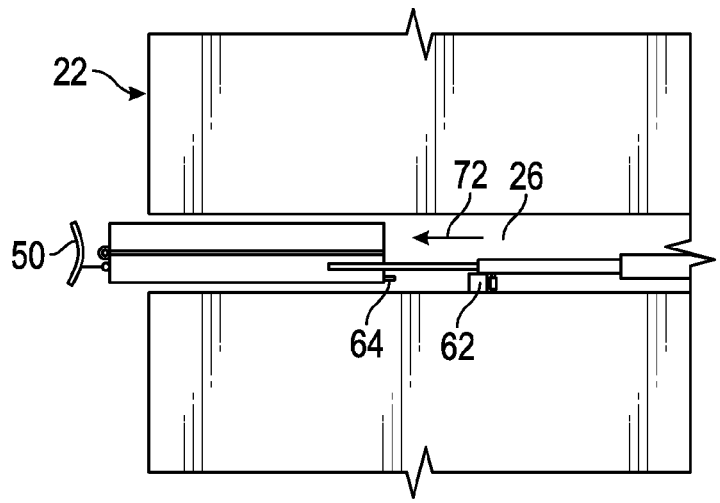
FIG. 6 is a schematic side view illustrating a subsequent stage of the support surface's transition from the retracted position to a deployed position.

FIG. 6 is a schematic side view of console assembly 22 immediately after the aircrew member stops pushing against closeout panel 52 and releases it. A biasing member (not shown) associated with push-push latch 62 (or associated with some other component of console assembly 22) pushes on latch engaging rod 64 or on support surface 40 and moves support surface 40 and mounting assembly 60 in the direction indicated by arrow 72. This push causes support surface 40 and mounting assembly 60 to begin moving towards their extended positions. As illustrated, the push by push-push latch 62 causes support surface 40 to only partially egress from recess 26. Support surface 40 extends beyond the opening to recess 26 by a distance that is sufficient to permit an aircrew member to grip support surface 40 and pull it the rest of the way out of recess 26. In other embodiments, mounting assembly 60 may be motorized and may move support surface 40 to its extended position automatically. In embodiments equipped with motorized components that automatically move support surface back and forth between the extended and retracted positions, push-push latch 62 may not be required.

Figure 7:
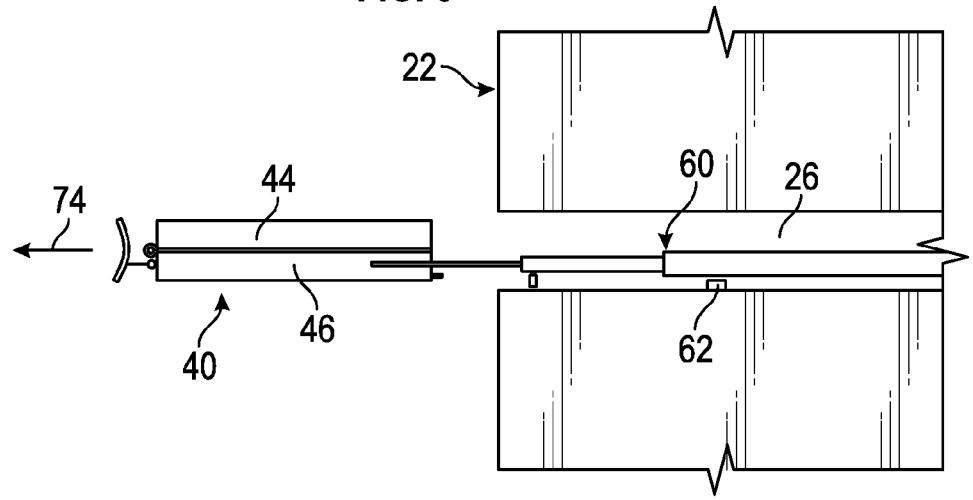
FIG. 7 is a schematic side view illustrating a subsequent stage of the support surface's transition from the retracted position to a deployed position.

FIG. 7 is a schematic side view of console assembly 22 after an aircrew member has pulled support surface 40 in the direction indicated by arrow 74 completely out of recess 26 to its extended position. This causes mounting assembly 60 to fully extend as well. In the illustrated embodiment, when mounting assembly 60 is fully extended, no portion of mounting assembly 60 protrudes from recess 26. Thus, if support surface 40 is detached from mounting assembly 60 in the extended position, there will be no sharp or rough portions of mounting assembly 60 that will come into contact with the aircrew member or otherwise interfere with flight operations.

In the extended position, support surface 40 is now situated in front of the area where an aircrew member (not shown) will be seated and is therefore in a position to support a tablet computer, paperwork, a meal tray, and a variety of other items. In some embodiments, the aircrew member may use support surface 40 as shown in FIG. 7, with half surface 44 folded over on top of half surface 46.

Figure 8:
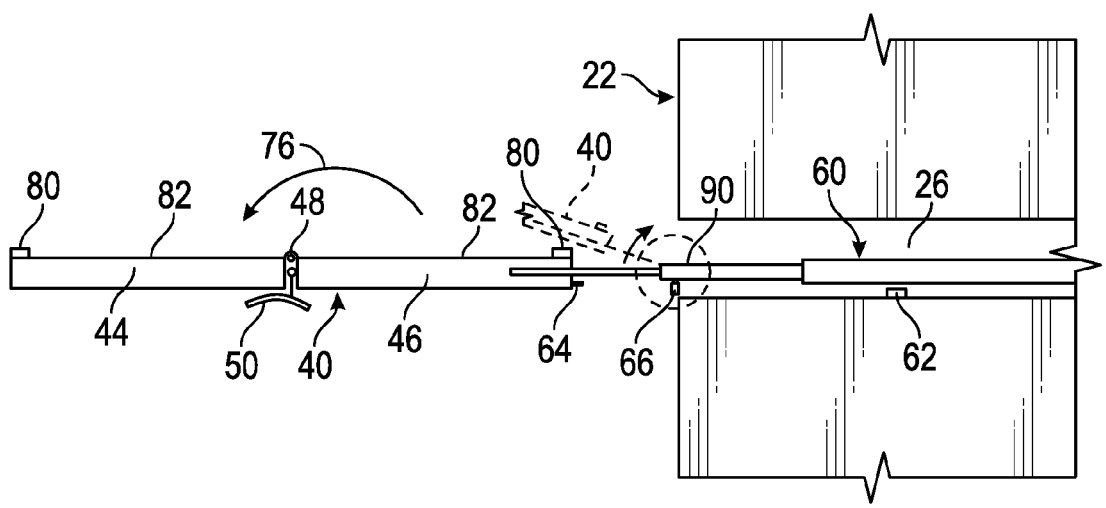
FIG. 8 is a schematic side view illustrating a subsequent stage of the support surface's transition from the retracted position to a deployed position.

FIG. 8 is a schematic side view of console assembly 22 in the extended position after support surface 40 has been unfolded. To unfold support surface 40, an aircrew member exerts a force on half surface 44 in the direction indicated by arrow 76. This movement causes half surface 44 to pivot about hinge 48 and rotate one hundred and eighty degrees to a position aligned with half surface 46. This effectively doubles the surface area available to the aircrew member to support whatever item(s) the aircrew member requires. This same movement causes closeout panel 50 to pivot in a counterclockwise direction (from the perspective of FIG. 8) and extend in a downward direction between half surface 44 and half surface 46. In some embodiments, closeout panel 50 may be pivotally coupled with half surface 46 and spring loaded to remain in the orientation illustrated in FIG. 4-7. In such embodiments, the unfolding motion of half surface 44 will move closeout panel 50 in a counterclockwise direction.

With support surface 40 unfolded, engagement surfaces 80 can be observed. In the illustrated embodiment, engagement surfaces 80 protrude above an upper surface 82 of support surface 40 and are configured to cooperate with one another to support a desk top, a tablet computer device or any other item having a length and/or width that exceeds the length and/or width of support surface 40. In some embodiments, engagement surfaces 80 are compressible and have a higher coefficient of static friction than upper surface 82. Or example, engagement surfaces may be made from rubber or from any suitable polymeric material. This ensures a robust engagement between support surface 40 and an item that an aircrew member rests on engagement surfaces 80.

An end 90 of mounting assembly 60 is configured to permit some amount of deflection of support surface 40, as indicated by the fragmented portion of support surface 40 illustrated in phantom. This capability is to take into account the possibility that the aircrew member may need to lift up on support surface 40 or may have his/her seat adjusted to a height that requires that there be some amount of tilt to support surface 40. This capability may be accomplished through the use of a hinge mount, a pivot, tab-and-slot engagement, or through any of a variety of other ways that permit upward deflection of support surface 40 with respect to mounting assembly 60. In some embodiments, support surface 40 may be moved back to the stowed position by lifting up on the distal end of support surface 40. In such embodiments, the ability to deflect support surface 40 by a predetermined amount without triggering a retraction of the entire assembly provides a measure of accommodation in the event there is some unintended upward deflection. For example, if the aircrew member unintentionally bumps the underside of support surface 40 while moving, it is advantageous for support surface 40 to have the ability to pivot for a predetermined distance without actuating a retraction.

With continuing reference to FIGS. 4-8, when an aircrew member has finished using support surface 40 and wants to stow it in recess 26, the aircrew member folds half surface 44 over onto half surface 46 by exerting a force on half surface 44 in a direction opposite to that indicated by arrow 76. This will cause half surface 44 to fold over and on top of half surface 46. In embodiments where closeout panel 50 is spring loaded and pivotally connected to half surface 46, the movement of half surface 44 towards its folded position permits closeout panel 50 to return to the position illustrated in FIGS. 4-7. The aircrew member then applies a force on support surface 40 in a direction opposite to that indicated by arrow 74. This force will cause mounting assembly 60 to collapse to its retracted position and will move support surface 40 into recess 26 to its retracted position. Once latch engaging rod 64 engages push-push latch 62, a further push by the aircrew operator in the direction indicated by arrow 70 will cause latch engaging rod 64 to engage push-push latch 62 and cause push-push latch 62 to latch onto latch engaging rod 64, effectively locking support surface 40 and mounting assembly 60 in their respective retracted positions.

In some instances, it may be necessary for an aircrew member to remove support surface 40 from mounting assembly 60 rather than return support surface 40 to its retracted position within recess 26. In such instances, quick release actuator 66 may be employed to detach pair of mounting arms 49 from mounting assembly 60. This action is illustrated in FIGS. 9-11.

Figure 9:
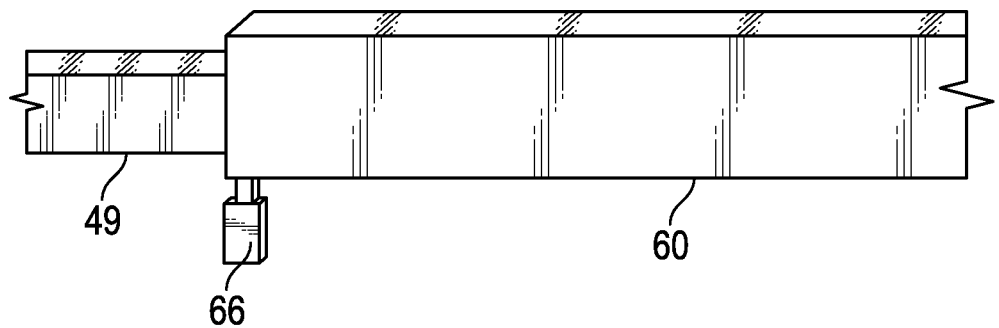
FIG. 9 is an expanded perspective view illustrating a portion of the support surface and a portion of a mounting assembly.

FIG. 9 is a fragmentary perspective view illustrating a portion of mounting assembly 60 and a portion of pair of mounting arms 49. In this illustration, the illustrated mounting arm of pair of mounting arms 49 is engaged with mounting assembly 60. To disengage these two components, an aircrew member need only push inwardly (i.e., in a direction into the page of FIG. 9) on quick release actuator 66.

Figure 10:
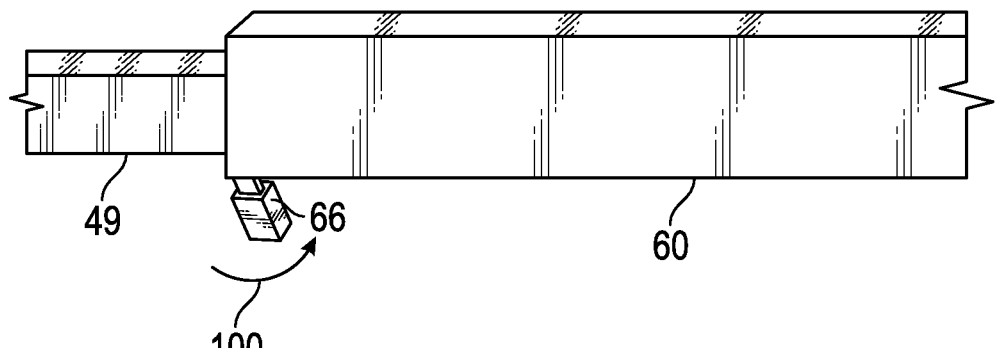
FIG. 10 is a perspective view illustrating actuation of a quick release mechanism of the mounting assembly.

FIG. 10 is a fragmentary perspective view illustrating quick release actuator 66 after it has been pushed in the direction indicated by arrow 100. This action actuates the quick release mechanism and frees pair of mounting arms 49 from mounting assembly 60. In this state, the illustrated mounting arm of pair of mounting arms 49 can be pulled away from mounting assembly 60.

Figure 11:
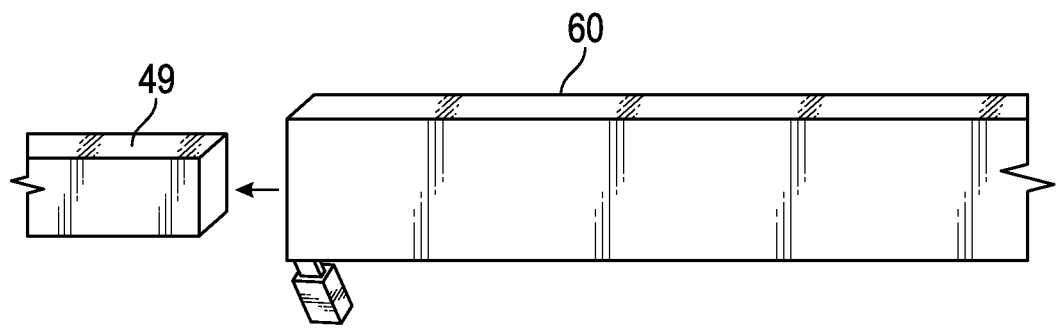
FIG. 11 is a perspective view illustrating detachment of the support surface from the mounting assembly.

FIG. 11 is a fragmentary perspective view illustrating separation of the illustrated mounting arm of pair of mounting arms 49 from mounting assembly 60 after quick release actuator 66 has been actuated. Although not illustrated, it should be understood that a quick release actuator associated with the other mounting arm of pair of mounting arms 49 would be contemporaneously actuated by an aircrew member so that both arms of pair of mounting arms 49 could be removed from mounting assembly 60 at the same time.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A console assembly for use on a flight deck of an aircraft, the console assembly comprising:
   a console configured to be mounted in the flight deck of the aircraft, the console having a recess defined therein, the recess having an opening, the opening facing towards the flight deck when the console is mounted in the flight deck;
   a mounting assembly mounted within the recess;
   a support surface mounted to the mounting assembly; and
   a closeout panel mounted to the support surface,
   wherein the support surface is configured to fit within the recess, wherein the mounting assembly is configured to facilitate movement of the support surface between a retracted position and a deployed position, wherein the support surface is disposed within the recess when in the retracted position and disposed outside of the recess when in the deployed position, wherein the closeout panel is disposed at a location on the support surface that causes the closeout panel to close the opening of the recess when the support surface is in the retracted position, wherein the support surface includes a first body and a second body, wherein the second body is pivotally attached to the first body, wherein the second body is pivotable from a first position to a second position where the first body and second body form the support surface, wherein when the second body is pivoted to the second position the closeout panel moves with respect to the support surface to a position below the support surface.

2. The console assembly of claim 1, wherein the support surface is configured to reside in the retracted position within the recess when the second body is folded over the first body in the first position.

3. The console assembly of claim 1, wherein an entire portion of the mounting assembly remains within the recess when the support surface is disposed in the deployed position.

4. The console assembly of claim 1, wherein the mounting assembly is configured to permit deflection of the support surface while the support surface is in the deployed position.

5. The console assembly of claim 4, wherein the mounting assembly permits the support surface to deflect by a predetermined amount while the support surface is disposed in the deployed position.

6. The console assembly of claim 5, wherein the predetermined amount is fifteen degrees.

7. The console assembly of claim 4, wherein the mounting assembly includes a release mechanism that permits detachment of the support surface from the mounting assembly.

8. The console assembly of claim 7, wherein the release mechanism comprises a quick release mechanism.

9. The console assembly of claim 8, wherein the quick release mechanism is positioned to permit actuation by a thumb of an aircrew member.

10. The console assembly of claim 1, further including an engagement surface mounted to the support surface, the engagement surface protruding above an upper surface of the support surface.

11. The console assembly of claim 10, wherein the engagement surface has a higher coefficient of static friction than the upper surface of the support surface.

12. The console assembly of claim 10, wherein the engagement surface comprises a compressible polymeric material.

13. The console assembly of claim 1, wherein a first appearance of the closeout panel matches a second appearance of a surface of the console.

14. The console assembly of claim 13, wherein the closeout panel is adjacent the surface.

15. The console assembly of claim 1, further including a latch associated with the console, wherein the support surface is retained in the retracted position by the latch when the latch is latched and wherein the support surface is free to move to the deployed position when the latch is unlatched.

16. The console assembly of claim 15, wherein the latch comprises a push-push latch.

17. A console assembly for use on a flight deck of an aircraft, the console assembly comprising:

a console configured to be mounted in the flight deck of the aircraft, the console having a recess defined therein, the recess having an opening, the opening facing towards the flight deck when the console is mounted in the flight deck;

a mounting assembly mounted within the recess;

a support surface mounted to the mounting assembly;

an engagement surface mounted to the support surface, the engagement surface protruding above an upper surface of the support surface;

a latch associated with the console; and a closeout panel mounted to the support surface, wherein the support surface is configured to fit within the recess, wherein the mounting assembly is configured to facilitate movement of the support surface between a retracted position and a deployed position, wherein the support surface is disposed within the recess when the support surface is disposed in the retracted position, wherein the support surface is disposed outside of the recess when the support surface is in the deployed position, wherein the support surface is retained in the retracted position by the latch when the latch is latched, wherein the support surface is free to move to the deployed position when the latch is unlatched, wherein the closeout panel is disposed at a location on the support surface that causes the closeout panel to close the opening of the recess when the support surface is in the retracted position, wherein the support surface includes a first body and a second body, wherein the second body is pivotally attached to the first body, wherein the second body is pivotable from a first position to a second position where the first body and second body form the support surface, wherein when the second body is pivoted to the second position the closeout panel moves with respect to the support surface to a position below the support surface, and wherein the engagement surface has a higher coefficient of static friction than the upper surface of the support surface.

* * * * *